G. SCHRADE.
ROUTING MACHINE.
APPLICATION FILED JUNE 30, 1910.
985,117.
Patented Feb. 21, 1911.
8 SHEETS—SHEET 8.
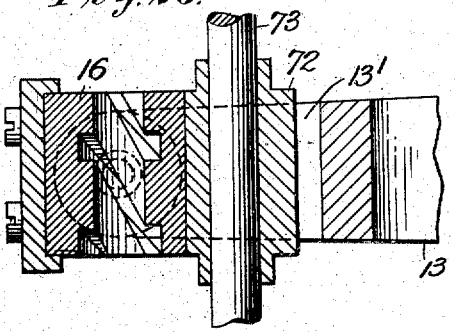
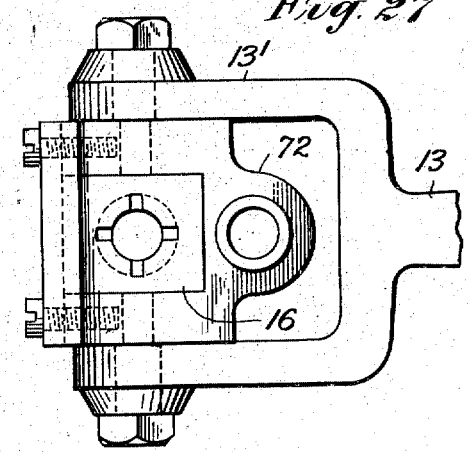
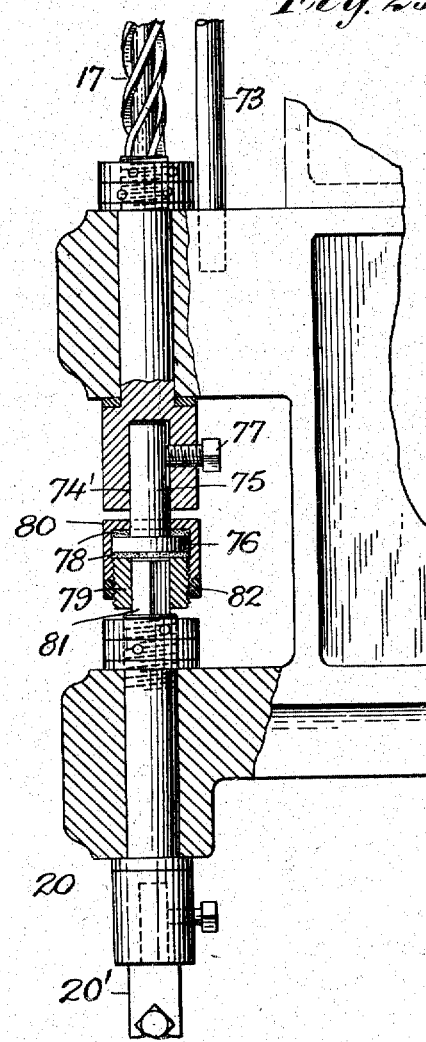

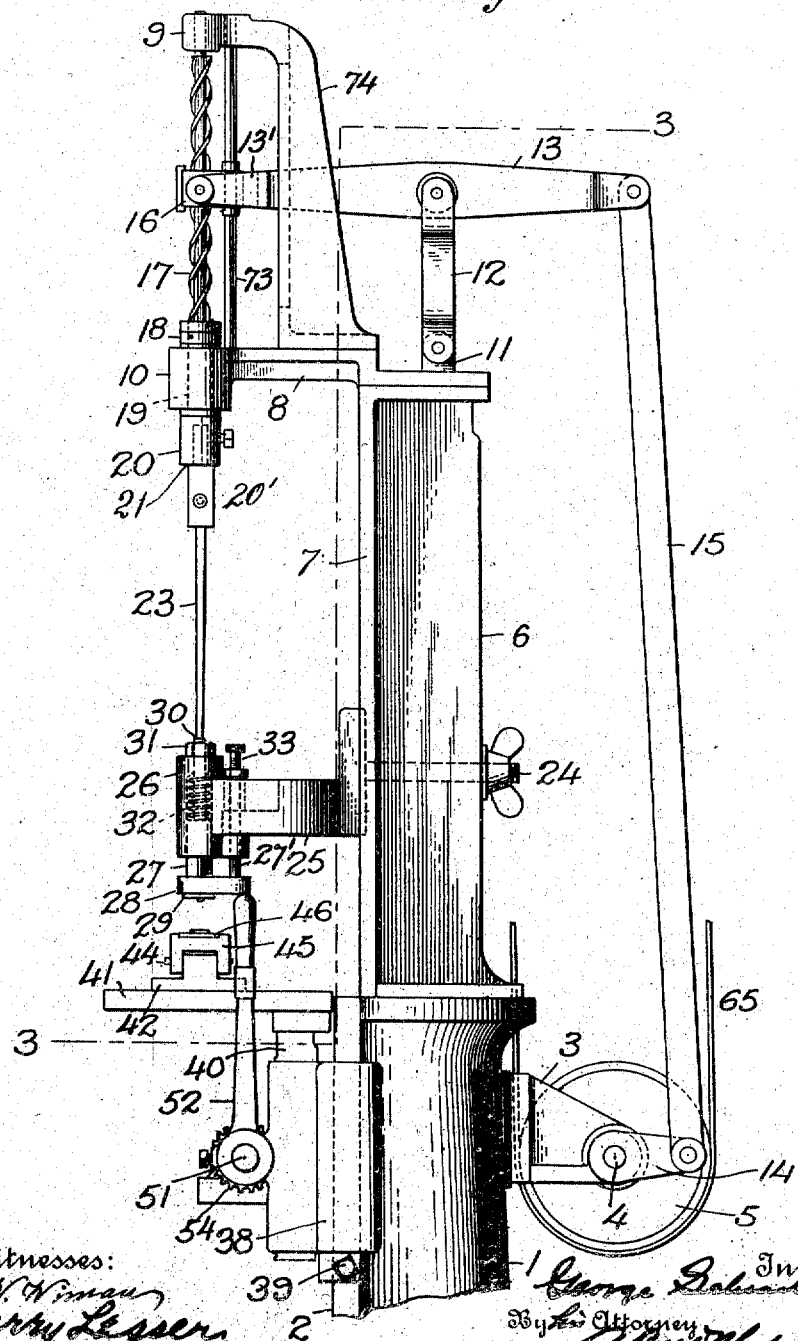

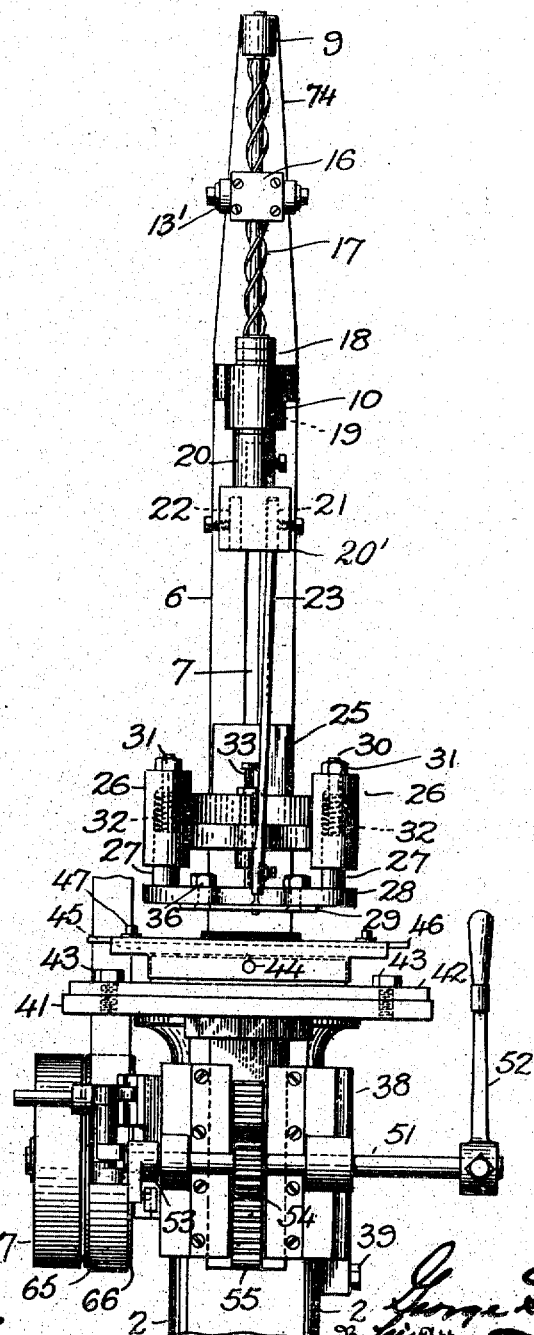

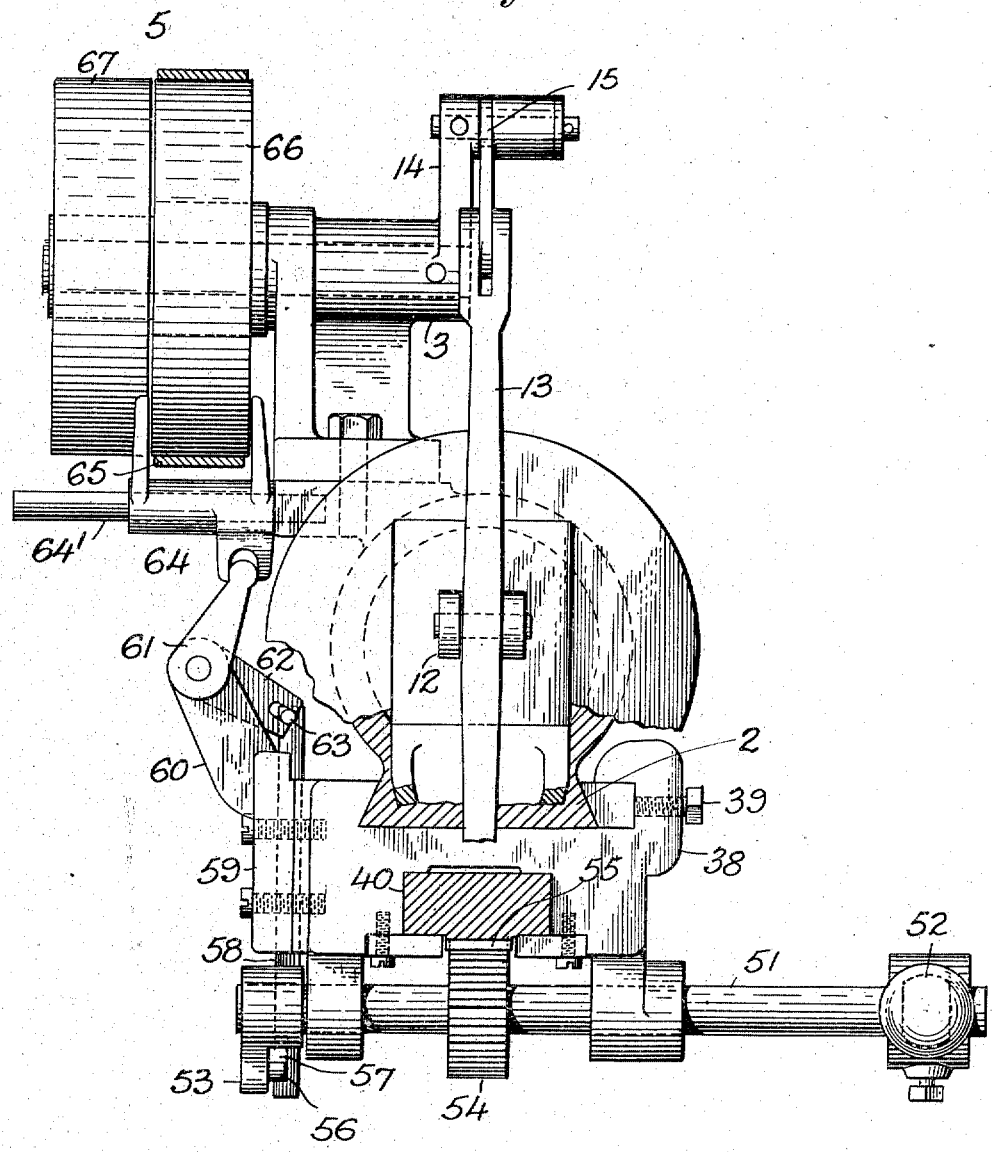

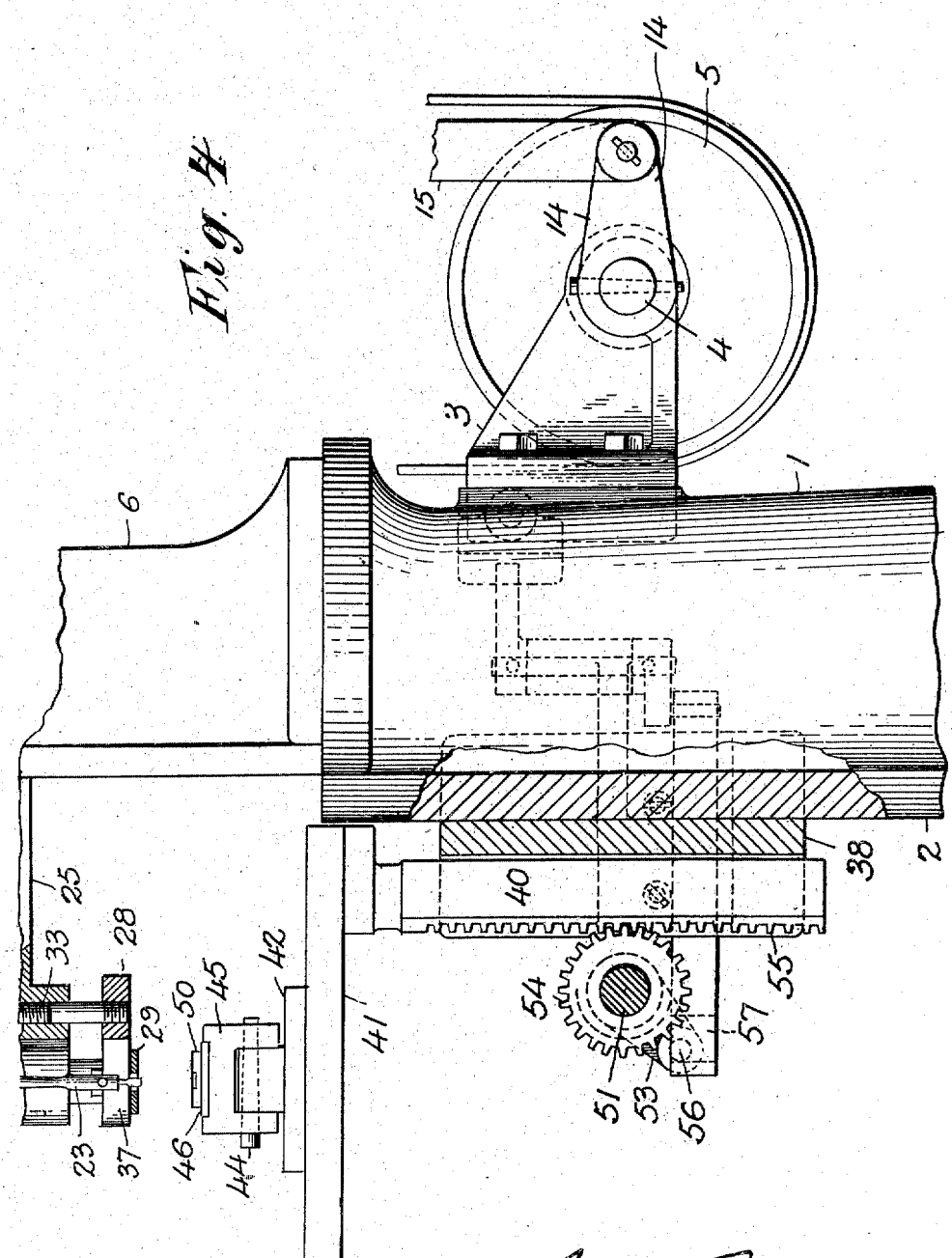

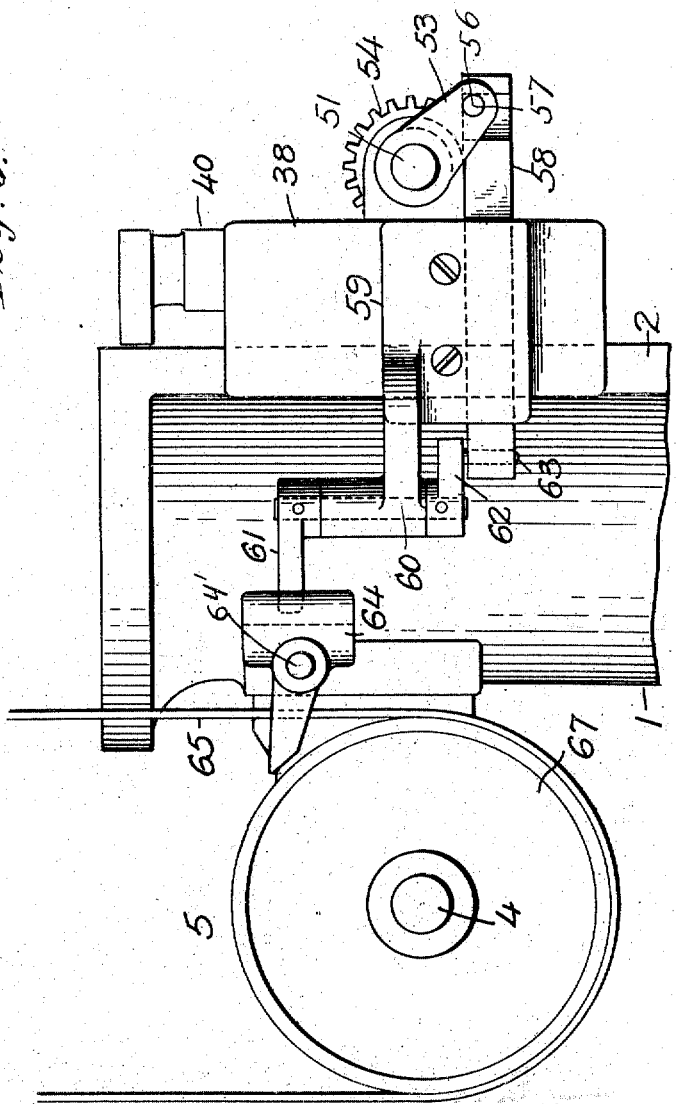

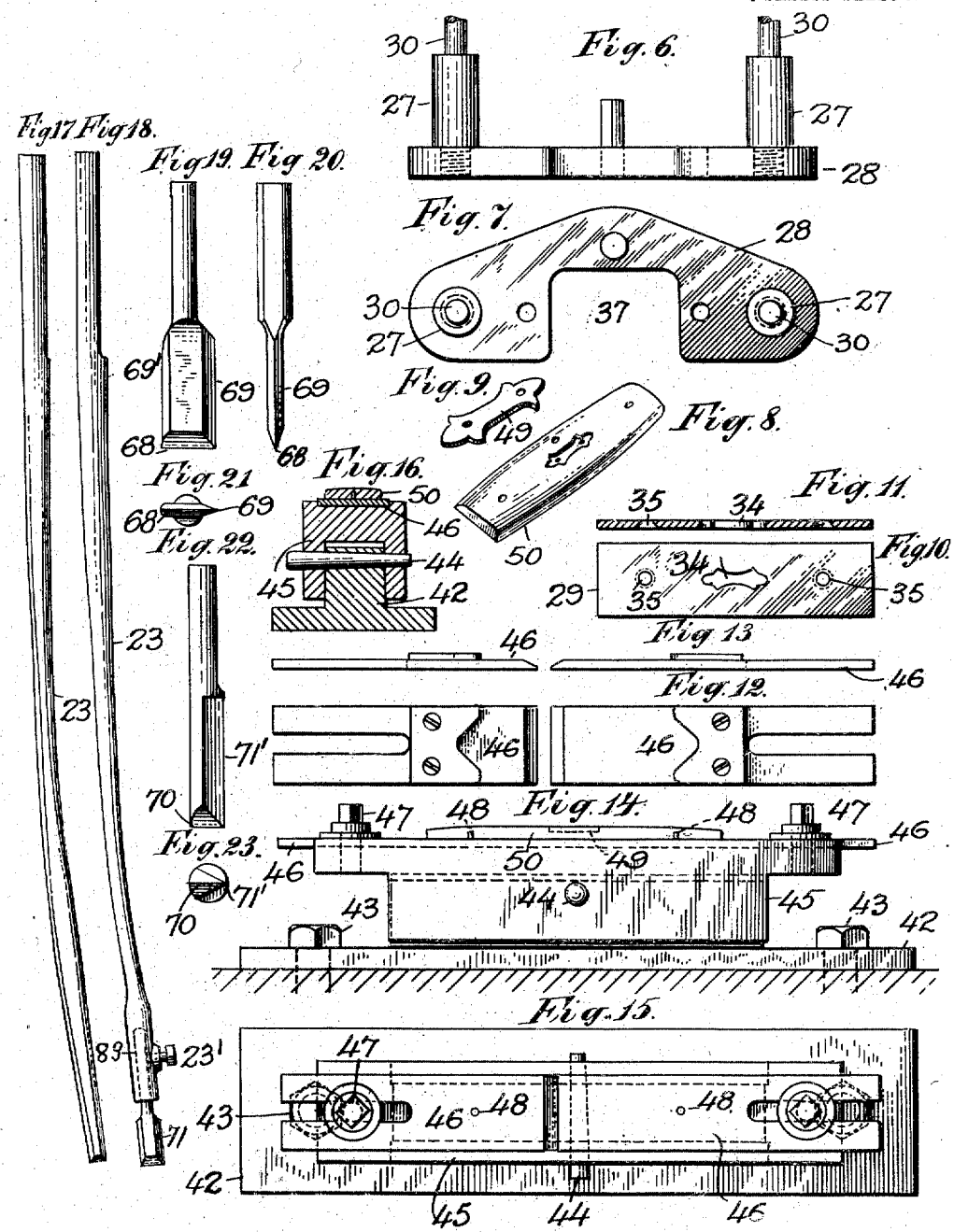
G. SCHRADE.
ROUTING MACHINE.
APPLICATION FILED JUNE 30, 1910.
985,117.
Patented Feb. 21, 1911.
8 SHEETS—SHEET 6.
Witnesses:
George Schrade, Inventor

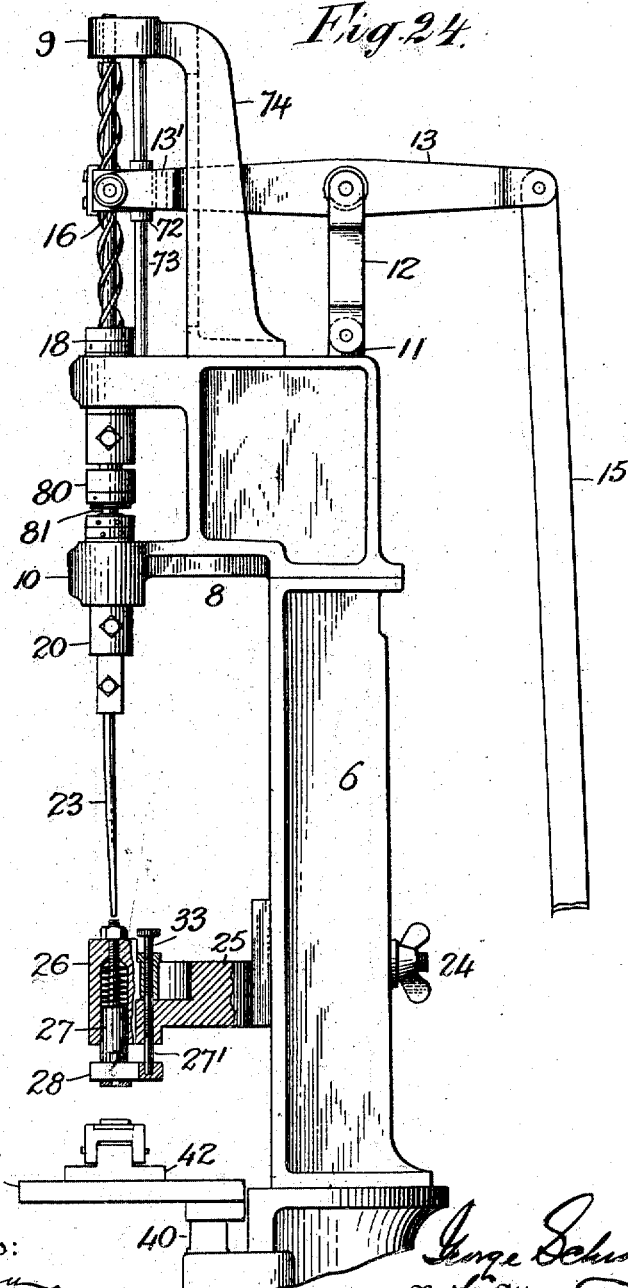

UNITED STATES PATENT OFFICE.

GEORGE SCHRADE, OF WALDEN, NEW YORK.

ROUTING-MACHINE.

985,117.　　　　Specification of Letters Patent.　　Patented Feb. 21, 1911.

Application filed June 30, 1910.　Serial No. 569,839.

*To all whom it may concern:*

Be it known that I, GEORGE SCHRADE, a citizen of the United States, residing at Walden, in the county of Orange and State of New York, have invented certain new and useful Improvements in Routing-Machines not heretofore known or used; and I hereby declare the following specification to be a full and clear description thereof, reference being had to the accompanying drawings.

This invention relates to machines for routing or mortising for inlaying work and more especially to that class adapted to work in a thin piece of bone, ivory, wood or similar substance used for the coverings of the handles of pocket knives, where it is required to produce a mortise or recess in these coverings for the inlay of a metal plate or shield, and my improvements embody mechanisms and manner of operating new and novel chisels or tools for routing out the material to secure the desired recess or mortise therein, and also new mechanisms and means for holding and adjusting the pieces of bone or other material while being operated on. These and other objects and details of the invention are more fully described in the accompanying specification, set forth in the claims and illustrated in the drawings, wherein:

Figure 1 is a side elevation of the machine. Fig. 2 is a front elevation of same. Fig. 3 is a sectional view on line 3—3 of Fig. 1. Fig. 4 is an enlarged detail view illustrating the adjusting means for the work holder. Fig. 5 is a fragmentary view of the machine from the side opposite Fig. 1. Figs. 6 and 7 are views of the die holder. Figs. 8 and 9 are perspective views showing the completed side of a pen knife and the plate which is to be inserted in same. Figs. 10 and 11 are plan and sectional views of the die. Figs. 12 and 13 are views of the work holding plates. Fig. 14 is a side elevation of the work holder. Fig. 15 is a plan view of same. Fig. 16 is a transverse sectional view of this work holder. Fig. 17 is an elevation of the routing tool. Figs. 18, 19, 20, 21, 22 and 23 show modified forms and construction of the routing tool. Figs. 24 and 25 show a device embodying means for relieving the routing tools from excess of strain by use of a friction packing. Figs. 26 and 27 are detail views of the nut for rotating the driving spiral.

This machine is mounted on a pedestal of any desired height and construction, which has on its face the guide ways 2 and at its rear a bracket 3 for the shaft 4 of the driving pulley 5 or any other well known means for communicating motion to the operative parts of the machine. Secured to the upper end of the pedestal is an extension 6 having a vertical slot 7 in its face. Upon this extension is secured a bracket 8 which terminates in a journal bearing 10 and also carries an upright extension 74 bent at the top to provide a journal 9 for the upper end of the spiral shaft. This extension 6 at its top is also provided with a fulcrum 11 in which is pivoted a lever 12 to support the driver or walking-beam 13 which is actuated by means of the crank arm 14 on the shaft 4 through the connecting link 15.

The front end 13′ of the walking beam 13 is forked, and pivoted therein is a nut 16 through which plays, when the walking beam is actuated, a driving spiral 17, the shaft of which is journaled in the bearings 9 and 10. At the lower end of the spiral is an adjustable collar 18 which is secured to the spiral shaft and forms a surface to support the same on the upper side of the bearing 10. The spiral shaft below the collar 18 is cylindrical and terminates in an enlarged head 20 beneath the bearing 10 for the reception of the shank of the routing tool holder 20′. Either one or two routing tools may be used in the sockets 21 and 22. As the nut 16 moves up and down the spiral shaft, it is rotated first in one direction and then in a reverse direction.

In Figs. 1 and 2 but one tool 23 is shown but it is obvious that a second tool identical with the one shown may be used and when in the narrowest part of the mortise which is being cut or the die therefor, the two tools, if two are used, will be brought together and the springing action of the metal of which the long tools are made will cause them to spring outward whenever the opening in the plate or die permits of this action. It is available to use either one or two routing tools as the shape or size of the mortise to be cut requires. I prefer to use only one tool or bit for the greater portion of the work. It must be understood that in speaking of the routing chisels the word tool or tools are used to designate substantially the same thing two chisels making up the routing tool when the size of the space in the die permits. Secured to the extension 6 by a bolt 24, which passes through the slot 7, is a bracket 25 carrying at its side the cylinder 26 in which are plungers 27 of a die holder 28 carrying on its lower side the die 29. At their upper ends the plungers 27, terminate in the stems 30, which are of less diameter than the plungers and extend through the upper end of the cylinders 26 where they are provided with nuts 31. Spiral springs 32 surround the stems 30 and rest upon the shoulders formed by the less diameter of the stems and the springs are thus confined between the upper ends of the plungers and the upper end of the bored interior of the cylinders 26. This is done in order to permit the die holder 28 to give slightly under pressure and automatically adjust itself when the machine is in operation. The upward movement of the die holder however is controlled by the stop screw 33 which is threaded in the bracket 25 and limits the rise of the plate 28 by reason of the stud 27' striking on the bottom thereof.

As will be seen in Fig. 2 the lower end of the routing tool extends into the opening 34 in the die 29, the latter having perforations 35 through which extend bolts 36 to secure the die to the upper plate or die carrier 28. The carrier 28 as will be seen in Fig. 7 has at its front side a recess 37 so as to expose the upper face of the die so the routing tools can reach it and to permit of the play of the tools therein. Secured to the guide ways 2 at the front of the pedestal is a sliding block 38 adjusted at any desired point by means of a set screw 39 and in this block is adjusted and moves vertically the toothed rack 40 of a table 41. This table carries or its upper face a stationary block 42 rigidly secured thereto by means of bolts 43 and on this block, pivoted by means of the pin 44, is a work holder 45 shown also in Figs. 14, 15 and 16 and which is recessed on its upper face to carry the plates 46 secured by means of anchor bolts 47 and having holding pins 48 which project upward and are intended to fit into holes in the side plates or covers 50 of the knife handle which is to be mortised; such holes being the same that are commonly employed to secure the ivory or bone side pieces or covers to the knife handle. By means of this construction of the work holder 45 just described it is given the facility of a tilting block and will adjust itself to inequalities in the covers. Such a recess as is desired to be cut by this machine is illustrated in Fig. 8 and the necessary plate or shield to fill same is represented by the enlarged view, Fig. 9, this latter plate or shield 49 being for the purpose of ornamentation or for the insertion of the owner's name or initial and may be secured within the mortise by means of pins or cement. The plates 46 are slotted at their inner ends for the passage of the anchor bolts 47 so as to permit of an adjustment which will separate the holding pins 48 to the proper distance necessary to register with the rivet holes in the covering of the knife and the work carrier 45 rocks for the purpose of allowing a small degree of freedom of movement for the inequalities in the thickness along the length of the covering in which the mortise is to be cut and have it of the same depth in all parts so that the shield or name plate may fit into same evenly.

Attached to one end of the shaft 51, which is journaled in the block 38, is a handle 52 for actuating the shaft, while at the other end is a crank arm 53. On the shaft is also a pinion 54 which meshes with the teeth 55 of the rack 40 in order to raise and lower the table and the work block 45 and carry the bone or celluloid plate to be mortised to and from the cutting tools. The crank arm 53 has on its inner face a stud 56 which plays in a recess 57 of a shielding bar 58 supported by a box 59 and this box is also pivoted with a bracket 60 in which is pivoted a bell crank lever 61 whose end 62 is forked to fit about the pin 63 carried by the bar 58 so that the other arm of this lever will throw the belt shifter 64 which slides on the supporting pin 64' and when the work carrier is elevated by means of the handle 52, the belt 65 is shifted from the loose pulley 66 to the fast pulley 67 and the work immediately begins and only continues as long as the table is elevated and the tool or tools are working upon the wood or bone side pieces. Simultaneously with the dropping of the table 41 the belt is automatically shifted to the loose pulley and the routing tool or tools come to a rest.

The routing tool shown in Fig. 17 is of a novel construction being chisel-shaped at its lower end and having cutting faces on both sides and the bottom. This routing tool requires to be of considerable length in order to have the necessary curve and spring to properly bend and do the work. Where the tool is all in one piece as shown in Fig. 17 the entire piece has to be thrown away when it is shortened by continual sharpening. In order to overcome this difficulty and loss I make the tool in two parts as shown in Fig. 18, the upper and springing portion serving the purpose of a bit holder and at its lower end being provided with a socket 83 into which is socketed a short cutting tool or bit 71 held by a set screw 23'.

In the form of cutting tool or bit 84 shown in Figs. 19, 20 and 21 the lower end 68 is sharpened, as is also one edge 69, while the rear edge 69' remains smooth. A similar construction but for work of a smaller range, is illustrated in Figs. 22 and 23 where it will be seen that the tool is triangular, with its lower edge 70 sharpened and also its front edge 71'.

Figs. 26 and 27 show the arrangement of the nut 16 in the fork 13' where a perforated block 72 is journaled in the fork to carry the nut through which passes a guide rod 73 secured to the bracket 8 and the upright arm 74 so that the nut may be retained in a position to create as little friction on the spiral as possible in its up and down movement. It will be seen that when the handle 52 is pulled over by the operator the table carrying the work holder is raised and by the same movement the driving belt is thrown over onto the driving pulley so that the walking-beam 13 rocks and passes the nut 16 along the spiral shaft 17 causing the same to rotate and revolve the routing tool or tools within the limits of the opening 34 of the die. On the downward thrust the tool holder revolves in one direction and on the upward movement this is reversed. When the machine is run at the proper speed the work of the tool or tools, in the material being operated on, is accomplished very quickly and evenly. In order to allow a certain amount of give in the movement of the tools so that the structure will not be too rigid and endanger the breaking of the bits, a flexible or yielding coupling may be provided for the lower end of the spiral shaft which is shown in Fig. 25. This consists of a socket 74' in which is inserted the shank 75 of a disk 76 and the said shank is held securely within its socket by means of the set screw 77. The disk 76 is confined between washers 78 of fiber and suitable compression is furnished by means of the nut 79 which is made adjustable within the casing 80 which incloses these members of the coupling. As the nut is screwed into its place the washers are compressed on each face of the disk 76 so as to establish a frictional connection between the casing 80 and the disk on the spiral shaft 17, but when any undue resistance is offered to the movement of the tool 23 the disk at the lower end of the spiral will be able to slip on the packing and turn independently of the lower shaft and consequently no damage will result to the bits. The lower shaft is in this case provided at its upper end with the squared portion 81 and a lock nut 82 prevents the release of the nut 79. As the machine operates the spiral and the tools are turned in different directions as the nut moves up and down on the spiral and this reversal of movement causes the operation of the cutting edges in either direction.

It is obvious that other modifications and arrangements of the parts of this machine may be resorted to without departing from the essential features above described.

What I claim as new and desire to secure by Letters Patent is:—

1. In a machine of the class described, the embodiment of a routing tool operated within the confined space of a die by means of a reciprocatingly rotating shaft substantially as shown and described.

2. In a machine of the class described, the combination with a routing tool adapted to operate within a confined pattern, of a shaft carrying the tool and means for rotating the shaft and intermittently changing the direction of rotation.

3. In a machine of the class described, the combination with a routing tool, of a die for limiting the operation of the tool, a rotating shaft carrying the tool and means for intermittently changing the direction of rotation of the shaft.

4. In a machine of the class described, the combination with a rotating routing tool, of a die controlling the limits of the operation of the routing tool, a shaft with a spiral thread carrying the tool, and a nut on the spiral shaft adapted to be reciprocated to rotate the shaft.

5. In a machine of the class described, the combination with routing tools, a die to receive the lower ends of the tools and limit their action, a shaft carrying the tools, spirals on the shaft, a nut on a guide way and operating on the spirals, and a lever carrying the nut to reciprocate it and cause it to turn the shaft.

6. In a machine of the class described the combination with an upright frame having brackets, of a shaft carried by the brackets, routing tools at the lower end of the shaft, sliding bracket carrying a die to confine the lower ends of the tools, spiral threads along the upper end of the shaft, a nut on the spirals, a guide rod for the nut and an oscillating lever to reciprocate the nut and cause it to rotate the shaft in different directions.

7. In a machine of the class described, the combination with an upright frame having brackets, of a shaft adapted to rotate in the brackets, routing tools with resilient stems carried at the lower end of the shaft, spiral threads on the upper end of the shaft, a reciprocating nut on the threads, an oscillating lever operating the nut, an adjustable bracket on the frame, a die with an opening to confine the lower ends of the routing tools and an adjustable bed to carry the article to be operated on.

8. In a machine of the class described, the combination with an upright frame having brackets, of an intermittently rotating shaft carried by the brackets, resilient routing tools at the lower end of the shaft, an adjustable bracket, a yielding plate under spring tension carried by the said bracket, die with a recess to confine the lower end of the routing tools and carried by the yielding plate, and an adjustable bed for carrying the work and adapted to carry it against the tools so as to be operated on.

9. In a machine of the class described, the combination with an upright frame having brackets, of driving tools, a crank arm driven by the driving tools, a vertically arranged shaft with spiral threads, a nut adapted to reciprocate on the shaft and reverse the rotation of the shaft, a lever carrying the nut and oscillated by the crank arm, a swinging pivot for the lever, routing tools at the lower end of the shaft, a die limiting the operation for the routing tools and an adjustable base for carrying the work and adapted to move vertically beneath the tools.

10. In a machine of the class described, the combination with an upright frame having brackets, of driving pulleys with a crank arm in one of the brackets, a vertical shaft adapted to reverse its rotation, reciprocating means driven by the crank arm and adapted to actuate the shaft, routing tools carried by the shaft, an adjustable die holder with a recess to limit the movement of the tools, an adjustable table beneath the tools and a rocking bed carried by the table to hold the work being operated on by the tools.

11. In a machine of the class described, the combination with an upright frame having brackets, fast and loose driving pulleys with a belt, a crank arm on the shaft of the driving pulleys, a vertical rotating shaft carried by brackets, reciprocating means operated by the crank arm to rotate the shaft and intermittently reverse the rotation, resilient routing tools, a yielding die holder and a die with a recess to control the operation of the tools, an adjustable table, a rocking work holder carried by the table, a shaft with an arm and means for moving the table vertically and simultaneously shifting the belt.

12. In a machine of the class described, the combination with an upright frame having brackets, fast and loose pulleys with a belt, a crank arm driven by the fast pulley a vertical rotating shaft carried by the brackets, spiral threads at the upper end of the shaft, a nut on the spiral threads, a lever reciprocating the nut, a link connecting the lever with the crank arm, a die holder and a die with a recess for limiting the movement of the tools, a vertically adjustable table beneath the tools, a tilting block carried by the table and adapted to hold the work beneath the tools, a toothed rack attached to the table, a shaft for the crank arm, a pinion on the shaft and meshing with the toothed rack and means operated by the said shaft for shifting the belt for the pulleys as the table is moved vertically.

13. In a machine of the class described, the combination with a rotating shaft, routing tools carried by the shaft, a die holder and die limiting the operation of the tools, yielding stems securing the die holder to an adjustable bracket, means connected with the crank arm for intermittently reversing the movement of the tool carrying shaft, an adjustable work holder beneath the tools, a rack to same with teeth a shaft with a pinion meshing with said teeth, a crank arm on the shaft and having a stud, and means connected with the crank arm for shifting the belts on the pulleys as the table is raised or lowered.

14. In a machine of the class described, the combination with an upright frame having brackets, of an intermittently rotating shaft carrying routing tools, a fast and loose pulley carried by a bracket and having a driving belt, a crank arm operated by one of the pulleys, means connected with the crank arm for rotating the shaft and reversing its direction of rotation, guide ways at the front of the frame, an adjustable block on the guide ways, a work table with a toothed rack carried by the block, a shaft with a toothed wheel meshing with said rack, a handle on the shaft, a crank with a stud on the shaft, a slide operated by the stud, a crank arm connected with the other end of the slide and a belt shifter operated by the crank arm to throw the belt from the loose to the fast pulley as the work table is elevated.

GEORGE SCHRADE.

Witnesses:
L. M. WILLIAMS,
ASA SNYDER.